(No Model.)

R. NEWTON.
SEWER TRAP.

No. 488,365. Patented Dec. 20, 1892.

WITNESSES:
M. F. Bligh.
Chas. H. Luther Jr.

INVENTOR:
Robert Newton
by Joseph A. Miller & Co.
Attys.

UNITED STATES PATENT OFFICE.

ROBERT NEWTON, OF PROVIDENCE, RHODE ISLAND.

SEWER-TRAP.

SPECIFICATION forming part of Letters Patent No. 488,365, dated December 20, 1892.

Application filed July 23, 1892. Serial No. 440,995. (No model.)

*To all whom it may concern:*

Be it known that I, ROBERT NEWTON, of the city of Providence, in the county of Providence and State of Rhode Island, have invented certain new and useful Improvements in Sewer-Traps; and I hereby declare that the following is a full, clear, and exact description of the same, reference being had to the accompanying drawings, forming part of this specification.

This invention has reference to improvements in the class of sewer-traps in which a water-seal is secured to shut off the flow of sewer-gas, and consists in the peculiar construction of the trap, as will be more fully set forth hereinafter; this invention being an improvement on that described and claimed by me in United States Letters Patent No. 478,808, issued July 12, 1892.

In water-seal sewer-traps it is essential that sufficient water shall, at all times, be retained in the trap to form a good and sufficient water-seal by which the sewer-gases are prevented from entering the house. In most of the traps, as heretofore constructed, the partial vacuum, formed by the column of water in the discharge-pipes, caused the water in the trap to be lifted by the atmospheric-pressure in the supply-pipe, so, if not all, at least so much of the water in the trap was discharged that not sufficient water remained to form a practical seal to prevent the sewer-gas from entering the house.

The object of this invention is to so construct a trap, in which the siphon will be broken as soon after the first inrush of water to the trap as air may enter the trap, so that a sufficient quantity of water must, at all times, remain in the trap to secure a practical and efficient seal.

Figure 1:
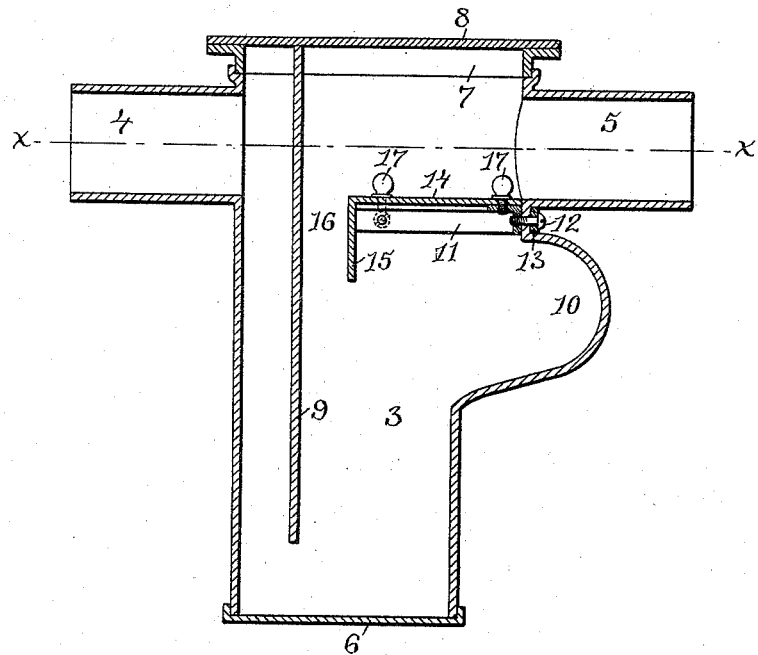
Figure 2:
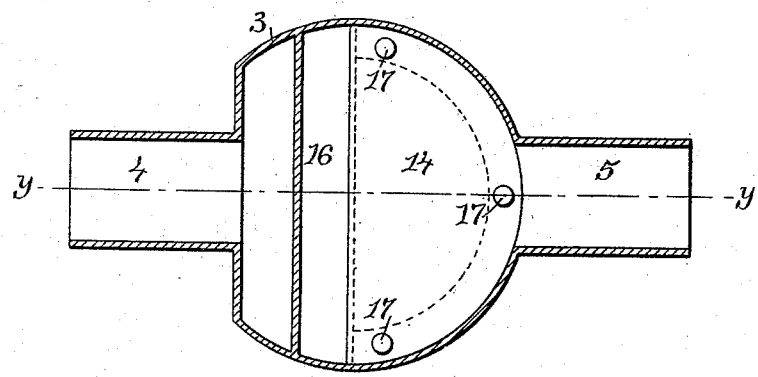

Figure 1 is a vertical cross-section through the center of the trap on the line Y—Y of Fig. 2. Fig. 2 is a horizontal cross-section on the line X—X of Fig. 1.

In the drawings 3 indicates a chamber having an inlet 4 and an outlet 5 practically on the same level, the lower end of this chamber 3 is closed by a cap 6 soldered thereto, and at the top of the chamber the flanged-ring 7 is soldered to the inner edges thereof;—the flange of this ring 7 is furnished with holes through which securing-devices, such as bolts, extending through the edges of or fastened to the plate 8, are passed and secured, thus holding this plate down to close the upper end of the chamber.

Extending from the upper edge of the chamber 3 is a partition 9 which divides the upper portion of the chamber into two unequal parts, the larger of which being on the outlet side; this partition 9 extends to within a short distance of the bottom of the chamber. Directly beneath the outlet 5 the wall of the chamber 3 is bulged outward to form the recess 10, and immediately above this recess is clamped a frame 11 by means of the screws 12 passing through the bend or plate 13 on the outside of the chamber and through perforations in this wall of the chamber; this frame 11 is shaped to conform to the cross-sectional shape of one-half of the chamber and is adapted to support the cross-partition 14 provided with the depending-lip 15 between which and the partition 9 is left a long narrow opening 16. The partition 14 may be formed in part with the frame 11, if desired, but is preferably secured thereto by thumb-screws 17—17 or otherwise.

The operation of the trap is as follows;— When properly connected and the water from a basin, a tub, or other source, is allowed to flow through the trap, the trap will be filled with water and, until the supply diminishes, the water will flow through the trap,—when the supply diminishes, the weight of the column of water in the discharge-pipe will form a siphon, the atmosphere will depress the water on the inlet side of the partition 9 and will raise the water on the outlet side of this partition until the air can pass under the lower edge of the same partition 9 and pass to the outlet 5 to break the siphon. Owing to the horizontal partition 14, the air, after passing under the partition 9, is compelled to pass up along the side of this vertical partition and through the long narrow opening 16 between the depending-lip 15 and the partition 9 and turning the corner over the edge of the partition 14 to pass to the outlet. When the air can first pass under the lower edge of the partition 9, the atmospheric-pressure still acts on the water in the bottom of the trap on the inlet side, and, consequently, owing to the difference in pressure caused by the siphon, the water fills the outlet side of the trap until the siphon is broken by the air,—at this time the quantity of water retained in the trap is much greater, owing to the horizontal partition 14 and depending-lip 15, than if the outflow of the water was not so restricted; the recess 10 is formed in the discharge side of the trap to further increase its capacity to contain water which, after the siphon is broken, forms the seal. This extra quantity of water, the water still flowing into the trap, finds its level as soon as the siphon is broken and forms an ample and sufficient depth of water to secure a practically perfect seal. The horizontal-partition 14 also directs the air-currents and prevents the air and water from forming induced currents by which the siphon is maintained after the air is passing under the vertical-partition 9 when the horizontal partition is not used.

In practice, I find that the opening below the lower edge of the vertical partition 9 and the area of the opening 16 should be no less than the area of the outlet 5.

For facilitating the practical use of this trap, the partition 9 may, if desired, be placed nearer the center of the chamber 3 than is shown in the drawings, and, in this construction, I provide the inlet side of the trap with a second horizontal partition similar to that marked 14 and secured to the side of the trap immediately below the inlet, a recess may also be formed in this side of the trap below the horizontal partition,—when so constructed the sides may be reversed and the workman may connect either side with the inlet or outlet,—in practice, this is a very important point, as it prevents the possibility of securing the trap in the wrong position.

Having thus described my invention, I claim as new and desire to secure by Letters Patent:—

1. In a sewer-trap, the combination with a suitable casing having inlets and outlets, of a frame removably secured below the outlets and a horizontal partition having a depending-lip secured to said frame, as described.

2. In a sewer-trap, the combination with a chamber divided by a downwardly-extending partition, and lateral inlets and outlets provided at opposite sides of said chamber, of a horizontal deflector removably secured below the outlet and having a depending-lip, as described.

3. In a sewer-trap, the combination with a chamber having an inlet and outlet, a recess 10 formed below the outlet, and a vertical partition extending from the top of the chamber nearly to the bottom of the same, of the frame 11 removably clamped to the side of the chamber below the outlet, and the removable partition 14, having the depending-lip 15, secured to said frame 11, as and for the purpose set forth.

In witness whereof I have hereunto set my hand.

ROBERT NEWTON.

Witnesses:
HENRY J. MILLER,
M. F. BLIGH.